June 21, 1927.

A. E. TROIEL 1,633,236

BAKING OVEN

Filed Sept. 4, 1923

INVENTOR.
ARTHUR E. TROIEL.
BY Dewey, Strong
Townsend & Loftus
ATTORNEYS.

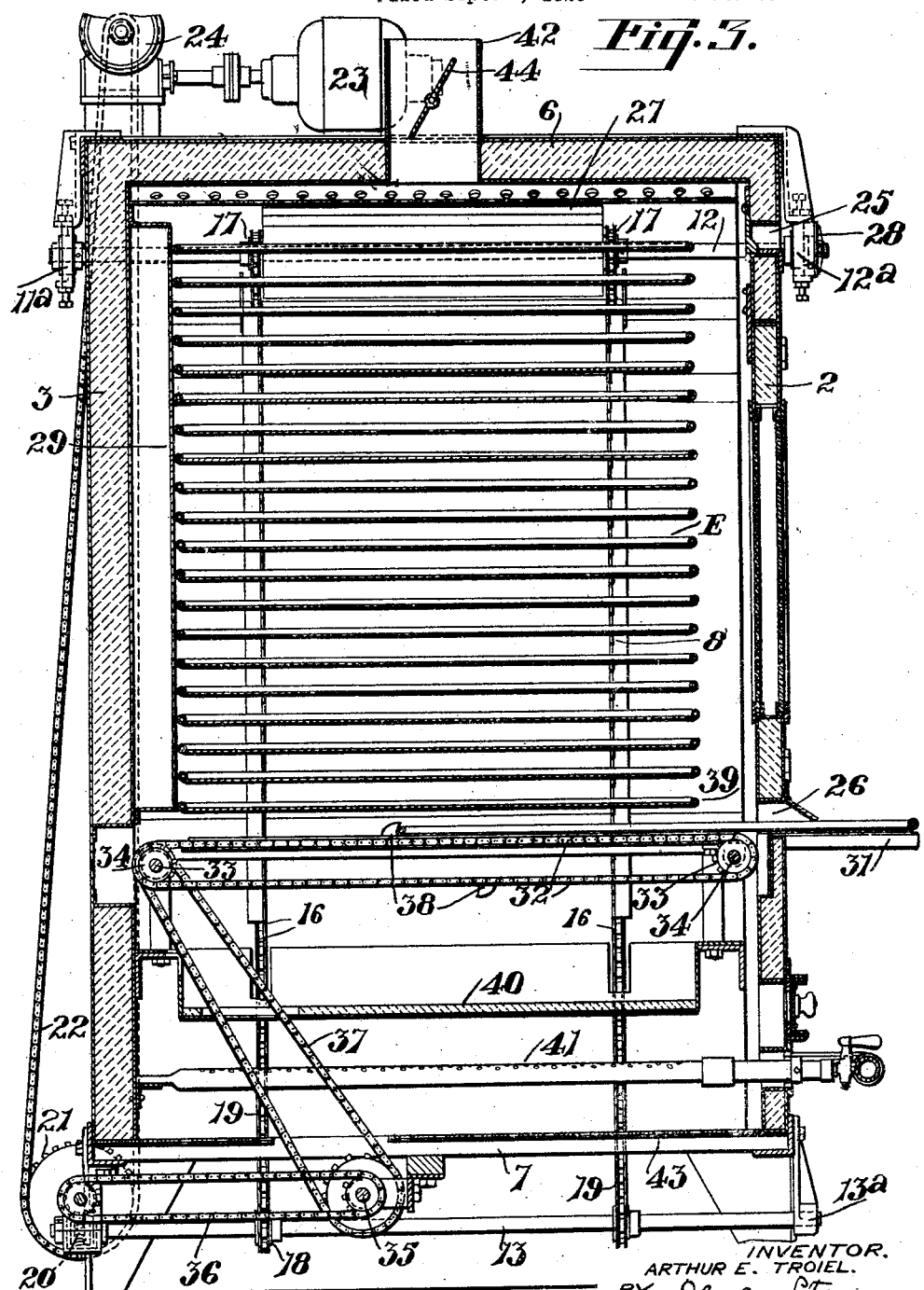

June 21, 1927.　　A. E. TROIEL　　1,633,236
BAKING OVEN
Filed Sept. 4, 1923　　4 Sheets-Sheet 4
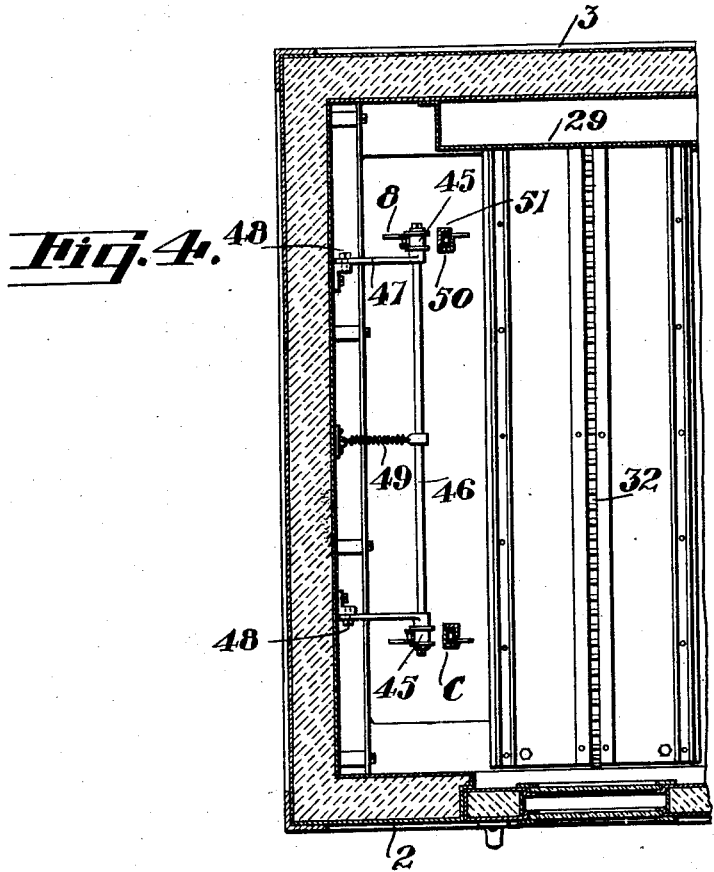
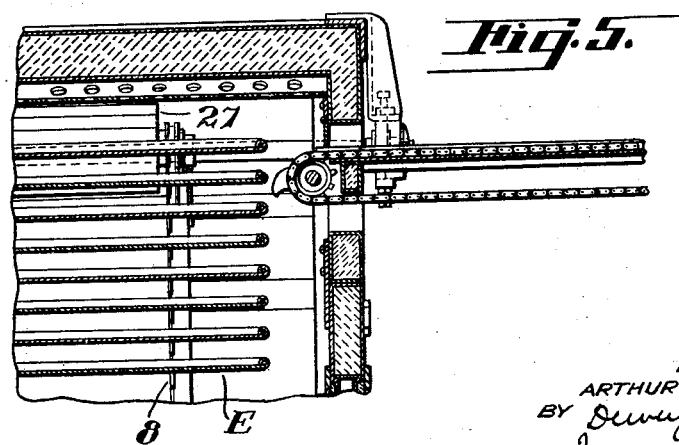
INVENTOR.
ARTHUR E. TROIEL.
BY Dewey, Strong,
Townsend & Loftus.
ATTORNEYS.

Patented June 21, 1927.

1,633,236

UNITED STATES PATENT OFFICE.

ARTHUR E. TROIEL, OF BERKELEY, CALIFORNIA.

BAKING OVEN.

Application filed September 4, 1923. Serial No. 660,737.

This invention relates to a baking oven and especially to that type which employs an endless carrier by which the baking pans are moved from one end of the oven to the other during the baking operation.

The object of the present invention is to generally improve and simplify the construction and operation of ovens of the character described; to provide an oven which will save space, fuel and labor; to provide an oven in which the baking chamber is vertically disposed and in which the baking pans are entered in the lower end and discharged from the upper end of the baking chamber, or vice versa, when the baking operation is completed; to provide a pair of opposed endless carriers capable of receiving the pans one by one and to continuously move or advance the pans from one end of the baking chamber to the other; and further to provide means for automatically delivering the pans to the carriers and, similarly, for removing the same when the baking operation is completed.

One form which my invention may assume is exemplified in the following description and illustrated in the accompanying drawings, in which—

Fig. 3 is a similar section taken at right angles to Fig. 2.

Fig. 4 is a cross-section taken on line 4—4, Fig. 2.

Fig. 5 is a section similar to Fig. 3 of the upper end of the oven showing the pan delivery mechanism.

Figure 1:
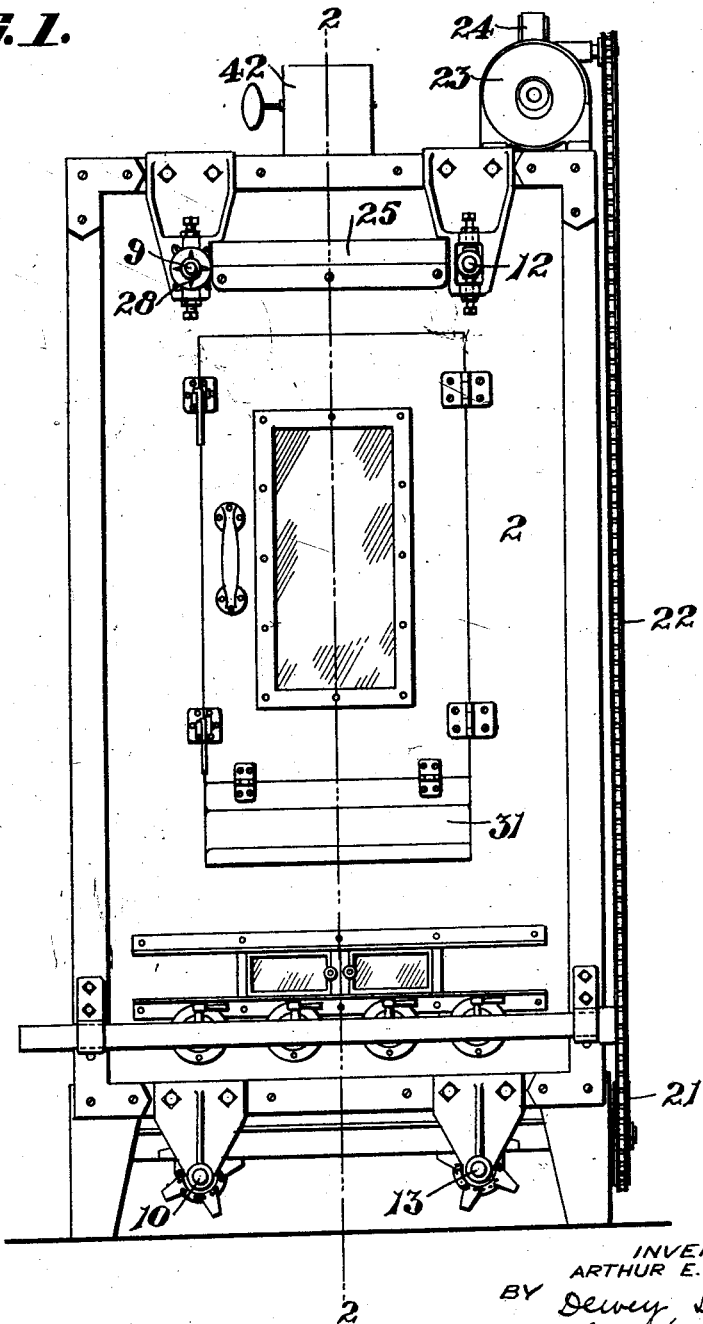
Fig. 1 is a front view of the oven.
Figure 2:
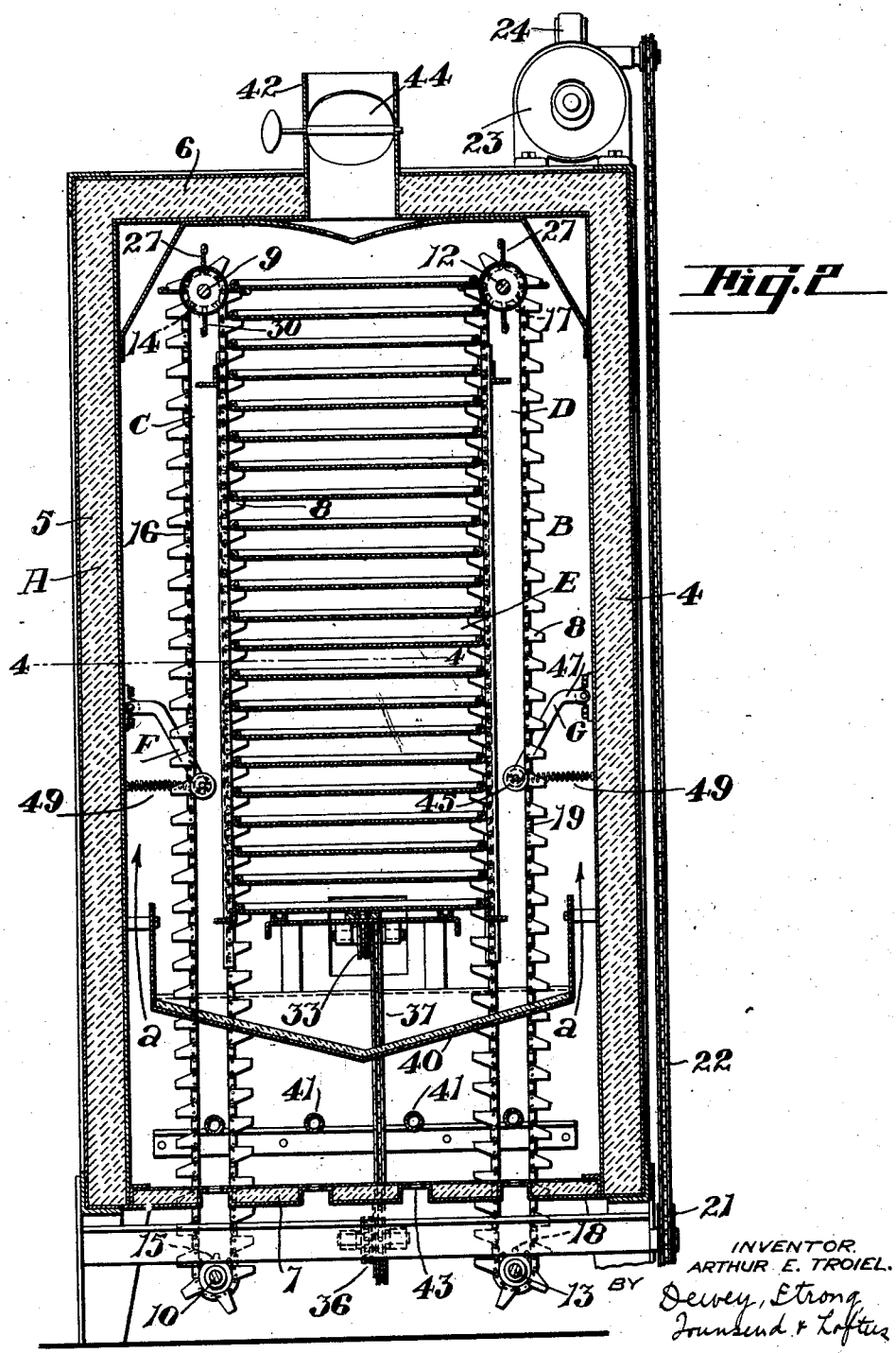
Fig. 2 is a central, vertical, longitudinal section taken on line 2—2, of Fig. 1.

Referring to the drawings in detail, and particularly to Figs. 1, 2 and 3, A indicates in general an oven consisting of front and rear sections 2 and 3, side sections 4 and 5, and top and bottom sections as indicated at 6 and 7, respectively. Formed interior thereof is a baking chamber B, which is vertically disposed, and mounted in the baking chamber is a pair of endless carriers or elevators generally indicated at C and D.

The carriers shown at C and D are opposed to each other, but are identical in construction. They move at a uniform rate of speed and they cooperate to support a plurality of baking pans, such as indicated at E. The carriers C and D are arranged in pairs, two sets of endless sprocket chains being employed in each instance and each set of chains being provided with supporting lugs as indicated at 8 to support baking pans during their travel through the baking chamber. The carrier C is disposed on one side of the baking chamber, and the carrier D on the opposite side; upper and lower shafts indicated at 9 and 10, respectively, forming a support and driving means for the carrier C, and similar shafts 12 and 13 forming a support and driving means for the carrier D.

Shaft 11 has two sprocket gears secured thereon at opposite ends as indicated at 14 (see Figs. 2 and 3). Shaft 10 is similarly provided with two sprocket gears 15; the sprocket gears being so positioned as to align and to support and drive the endless chains or carriers indicated at 16. Shafts 12 and 13 similarly carry sprocket gears 17 and 18 and cooperating endless sprocket chains 19; the lugs 8 being secured to the opposite sprocket chains as shown in Fig. 2.

The sprocket gears 14 and 17 are in reality nothing more or less than idlers, while the sprocket gears 15 and 18 are drivers; these gears, together with their shafts 10 and 13, being driven in unison from the cross-shaft 19 and a pair of worm gear drives as indicated at 20; that is, the shafts 10 and 13 are each provided with a worm gear, and each in turn intermeshes with a worm carried by the cross-shaft 19. This shaft is driven through means of a sprocket gear 21 and a chain 22 from an electric motor or the like indicated at 23; a reduction drive being interposed between the motor and the chain 22 as indicated at 24. Shaft 19 therefore rotates at a fairly slow speed but this speed is again reduced through the worm drive indicated at 19 and 20. Shafts 10 and 13 therefore rotate at a still lesser speed and the chains or carriers indicated at C and D move correspondingly.

The pans receiving the material to be baked are entered through an opening indicated at 25, near the upper end of the baking chamber, and they are then gradually lowered until they align with an opening 26 formed adjacent the lower end of the baking chamber, where they are automatically or otherwise removed, as will hereinafter be described.

The speed of the carriers depends to a large extent upon the material baked and it may therefore be increased or decreased as various conditions may require as the baking operation must be completed during the travel of the pans from the point of ingress to the point of discharge.

In the form of structure shown in Fig. 3, it is necessary to manually deliver the pans through the opening 25, and as the pans are only supported by the lugs indicated at 8, it is obvious that some guide or temporary support must be provided while the pans are being entered. This is accomplished by placing a roller on the respective shafts indicated at 11 and 12. These rollers are disposed between the sprocket gears 14 and 17 and they are provided with wings or vanes as indicated at 27 which align with the lugs 8. One of the shafts is provided with an indicator on its exterior end as shown at 28 (see Fig. 1); this member indicating the position of the vanes within the oven. In other words if it is desired to enter a pan, the operator waits until the indicating member 28 shows that a set of vanes is assuming a horizontal position or, in other words, that they are aligning with the opening 25. When this is the case it is only necessary for the operator to enter the pan and push it inwardly until it engages the back stop indicated at 29 (see Fig. 3) when the pan may be released as it will be automatically taken care of thereafter; that is, the vanes continuously rotate with the rollers and the shafts 11 and 12 and as such gradually assume a vertical position as shown at 30 (see Fig. 2). They thus move away from the pan and deposit the same on the adjacent supporting lugs 8, and these in turn continue to support the pans until they reach the lower end of the baking chamber or at a point where they align with the discharge opening 26. They are here automatically removed and delivered to a shelf 31 and this is accomplished as follows:

Arranged longitudinally of the oven is an endless ejecting sprocket chain such as shown at 32. This is carried by a pair of sprocket gears 33 secured on shafts 34, the shafts 34 being driven from the cross-shaft 19 by means of an intermediate shaft 35 and a pair of speed increasing chains such as indicated at 36 and 37; that is, the speed of the ejecting chain is fairly high when comparison is made with the speed of the carriers, this being due to the fact that the ejecting chain only carries two lugs such as shown at 38 and, also, due to the fact that these lugs must alternately engage and eject a pan during one complete revolution or circuit of the chain 32; in fact, the lug 38 engages the rear edge of a pan the moment it moves into alignment with the opening 26 and it discharges or expels the pan before the next pan assumes this level or position.

To further illustrate this point it might be stated that lug 38 travels from one sprocket gear 33 to the other during that period of time which it takes the pan E to move from the point indicated at 39 downwardly into engagement with the ejector chain 32.

The oven may be heated in any suitable manner but it is in this instance provided with an intermediate bottom or baffle section 40, below which is mounted a series of gas burners such as indicated at 41. The intermediate bottom section or baffle member 40 deflects the heat to the sides and ends of the oven and it then rises through passages formed at the respective ends thereof as indicated by the arrows $a$, the heat finally discharging at the upper end and entering a stack such as indicated at 42. Fresh air to support combustion is admitted through perforations formed in the bottom of the oven as shown at 43 and the draft maintained being regulated by a damper in the stack as indicated at 44.

The intermediate baffle members may be employed if desired but as these are more or less commonly used in ovens of different types, it is thought unnecessary to illustrate the same.

Due to the high temperature maintained in the oven, it is desirable to so design the moving parts thereof that the bearings supporting the same may be placed exterior thereof. It is for this reason that the ends of the upper and lower shafts 10, 11, 12 and 13 are disposed exterior of the oven; the bearings for the upper shafts 11 and 12 being indicated at $11^a$ and $12^a$ (see Fig. 3), and the bearings for the shafts 10 and 13 being illustrated at $10^a$ and $13^a$.

Experience has shown that the endless sprocket chains or carriers C and D contract and expand to a considerable extent during heating and cooling of the oven. To take care of such expansion and construction, and to automatically maintain the inner runs of the chains in a taut condition, a pair of tightening rollers is employed in connection with each set of chains as generally indicated at F and D. These tightening rolls are perhaps best illustrated in Fig. 4. The rollers shown at 45 are journaled on cross-shafts 46 turnably mounted in arms 47, which are pivotally secured at their inner ends as at 48 to the respective walls of the oven. A pair of helical springs connected to the respective shafts and the adjacent walls, as shown at 49, exerts a constant pull on the shafts 46 and in this manner maintains the carriers in a taut condition. Means are also employed for guiding the inner runs of the carriers and this is also perhaps best illustrated in Fig. 4. The inner runs are guided by channel irons shown at 50, which extend from end to end of the baking chamber and they are also partially enclosed by angle irons such as shown at 51. In other words, the inner runs of the chains are entirely enclosed and guided and the only portions projecting are the carrying or supporting lugs 8 which project outwardly between the angle iron members 51 and the opposite side walls of the channel sections 50. Displacement or disalignment of the lugs is thus prevented, as far as vertical travel is concerned, and as both carriers are driven in unison from the cross-shaft 19, it is obvious that right-angular alignment will also be maintained.

In actual practice it has been found that certain materials are best baked when first exposed to a high bottom heat, while other materials are best baked by being first exposed to a greater top heat. If a bottom heat is required during the first portion of the baking operation, it is best to enter the material at the lower end of the baking chamber and to discharge it at the top end, and, if the case is reversed, the material is delivered at the top, as indicated in Fig. 3, and is discharged at the bottom of the baking chamber. In one case it would be necessary to reverse the direction of travel of the carriers and, while this may be accomplished in numerous ways, it might be readily taken care of by employing a reversible motor such as shown at 23. The arrangement shown in Fig. 3 is employed to the greatest advantage where the material is entered at the top of the oven and discharged at the bottom, and the arrangement shown in Fig. 5 is also the same, with the exception that it provides means for automatically delivering and discharging the pans. A reversal of conditions would only require that the ejector be moved to the top of the baking chamber, and that the delivering mechanism indicated in Fig. 5 be lowered to the bottom of the baking chamber. These changes can readily be made by the manufacturer and a detail illustration thereof is therefore thought unnecessary.

While the present mechanism has been described and illustrated as a baking oven, I wish it understood that it may also be employed as a dehydrator, no change in construction being required as it will only be necessary to decrease the size of the gas burners or other heating medium employed.

I further wish it understood that the device may operate as a cooler; that is, cooling coils might be substituted for the burners and they might furthermore be arranged around the carriers so as to cool the material carried by the pans. For instance, in candy factories it is often desirable to quickly cool certain chocolate coated candies and the like, and this can readily be accomplished by the present mechanism by merely inserting cooling coils.

It should therefore be understood that the mechanism illustrated may serve other functions besides that of a baking oven.

Having thus described my invention, what I claim and desire to secure by Letters Patent is—

1. A carrier of the character described comprising a pair of opposed interspaced carriers, each carrier consisting of interspaced endless sprocket chains supported by upper and lower sprocket gears, a plurality of interspaced supporting lugs on each chain, the lugs on the respective chains aligning horizontally and forming a plurality of four point supports, means for driving the chains in unison, and a pan receiving and temporary supporting device rotating in unison with the sprocket gears and automatically delivering the pans one by one to the supporting lugs on the chains.

2. A carrier of the character described comprising a pair of opposed interspaced carriers, each carrier consisting of interspaced endless sprocket chains supported by upper and lower sprocket gears, a plurality of supporting lugs on each chain, the lugs on the respective chains aligning horizontally and forming a plurality of four-point supports, means for driving the chains in unison, and a pan guiding and temporary supporting device cooperating with the chains, said device comprising a plurality of radially disposed vanes positioned between the upper sprocket gears, said vanes rotating in unison with the sprocket gears and the chains and aligning with the supporting lugs on the sprocket chains.

3. A carrier of the character described comprising a pair of opposed interspaced carriers, each carrier consisting of interspaced endless sprocket chains supported by upper and lower sprocket gears, a plurality of supporting lugs on each chain, the lugs on the respective chains aligning horizontally and forming a plurality of four-point supports, means for driving the chains in unison, a pair of drums interposed between the upper sprocket gears and interspaced vanes secured to said drums and extending from end to end thereof, said vanes aligning with the lugs of the sprocket chains and forming temporary receiving and supporting devices for baking pans when placed in the oven.

4. A carrier of the character described comprising a pair of interspaced parallel upper horizontally disposed shafts, a pair of interspaced parallel horizontally disposed lower shafts, a pair of interspaced sprocket gears on each of the upper shafts, a pair of interspaced sprocket gears on each of the lower shafts, said sprocket gears aligning with the sprocket gears on the upper shafts, four sets of endless sprocket chains carried by the respective sets of sprocket gears, a plurality of supporting lugs secured on each chain, said lugs forming a plurality of superposed four-point supports, means for driving the chains in unison to maintain the lugs in horizontal alignment, and a plurality of radially disposed vanes carried by the upper sets of sprocket gears, said vanes rotating in unison with the sprocket gears and aligning with the supporting lugs on the chains.

5. A carrier of the character described comprising a pair of interspaced parallel upper horizontally disposed shafts, a pair of interspaced parallel horizontally disposed lower shafts, a pair of interspaced sprocket gears on each of the upper shafts, a pair of interspaced sprocket gears on each of the lower shafts, said sprocket gears aligning with the sprocket gears on the upper shafts, four sets of endless sprocket chains carried by the respective sets of sprocket gears, a plurality of supporting lugs secured on each chain, said lugs forming a plurality of superposed four-point supports, means for driving the chains in unison to maintain the lugs in horizontal alignment, a plurality of radially disposed vanes carried by the upper sets of sprocket gears, said vanes rotating in unison with the sprocket gears and aligning with the supporting lugs on the chains, a horizontal endless sprocket chain disposed between the first named chains and travelling at right angles thereto, ejector lugs carried by said last named chain, and means for driving the last named chain in unison with the first named chains but at an accelerated speed.

6. A carrier of the character described comprising a pair of opposed interspaced carriers, each carrier consisting of interspaced endless sprocket chains supported by upper and lower sprocket gears, a plurality of interspaced supporting lugs on each chain, the lugs on the respective chains aligning horizontally and forming a plurality of four point supports, means for driving the chains in unison, a pan receiving and temporary supporting device rotating in unison with the sprocket gears and automatically delivering the pans one by one to the supporting lugs on the chains, and other means for automatically removing the pans from the supporting lugs.

7. A carrier of the character described comprising a pair of opposed interspaced carriers, each carrier consisting of interspaced endless sprocket chains supported by upper and lower sprocket gears, a plurality of interspaced supporting lugs on each chain, the lugs on the respective chains aligning horizontally and forming a plurality of four point supports, means for driving the chains in unison, a pan receiving and temporary supporting device rotating in unison with the sprocket gears and automatically delivering the pans one by one to the supporting lugs on the chains, a horizontal endless sprocket chain disposed between the first named chains and travelling at right angles thereto, ejector lugs carried by said last named chain and engageable with the pans to remove them one by one from the supporting lugs on the first named chains, and means for driving the horizontal chain at a faster speed than the first named chains.

ARTHUR E. TROIEL.